(12) United States Patent
Sellars et al.

(10) Patent No.: US 7,436,291 B2
(45) Date of Patent: Oct. 14, 2008

(54) PROTECTION OF DEVICES IN A REDUNDANT CONFIGURATION

(75) Inventors: Terry Sellars, Kanata (CA); Dale Aiken, Kanata (CA); Mark Horwood, Kanata (CA)

(73) Assignee: Alcatel Lucent, Paris (FR)

( * ) Notice: Subject to any disclaimer, the term of this patent is extended or adjusted under 35 U.S.C. 154(b) by 225 days.

(21) Appl. No.: 11/324,596

(22) Filed: Jan. 3, 2006

(65) Prior Publication Data

US 2007/0157052 A1 Jul. 5, 2007

(51) Int. Cl.
*G08B 23/00* (2006.01)
*G08B 29/00* (2006.01)
*G05B 11/01* (2006.01)
*G05B 23/02* (2006.01)

(52) U.S. Cl. .................. 340/500; 340/506; 340/507; 340/508; 340/525; 340/3.3; 340/3.44; 700/12; 700/21; 700/27; 714/44

(58) Field of Classification Search .............. 340/500, 340/506, 3.43, 3.44
See application file for complete search history.

(56) References Cited

U.S. PATENT DOCUMENTS

| 5,577,201 A | * | 11/1996 | Chan et al. ............ 714/57 |
| 6,275,864 B1 | * | 8/2001 | Mancusi et al. ........ 709/250 |
| 6,438,684 B1 | * | 8/2002 | Mitchell et al. ........ 713/1 |
| 6,868,309 B1 | * | 3/2005 | Begelman ............ 700/273 |

* cited by examiner

*Primary Examiner*—Donnie L Crosland

(57) ABSTRACT

A network communication device is provided, comprising a control processor for controlling operation of the device, a reset module which is controllable independently of the control processor for performing a reset operation of the device, and a reset control interface for receiving a reset signal, the reset module being responsive to the reset signal for performing the reset operation. A monitor is provided for monitoring the status of the control processor and an interface is adapted to transmit information relating to the monitored status from the device. A second, inactive device is provided to protect the communication device in the event of a control fault which renders the communication device unreachable. The protection device includes a reset interface for transmitting a reset signal to the reset module to enable the communication device to release activity.

24 Claims, 3 Drawing Sheets

PROTECTION OF DEVICES IN A REDUNDANT CONFIGURATION

FIELD OF THE INVENTION

The present invention relates to protection of devices in a redundant configuration and in particular, but not limited to, the protection of communication devices such as line or circuit cards.

BACKGROUND OF THE INVENTION

Line cards for communication systems provide an interface for connecting communication elements to a network and typically include a number of communication ports for transmitting and receiving communication traffic to and from the network. In one configuration, an additional line card is provided for each active line card of a network element to protect the active card in the event of a fault or failure. The additional line card is typically identical to the active card and is capable of assuming and performing the functions of the active card, if the active card malfunctions, so that disruptions in communication are reduced while the active card is replaced or repaired.

An example of a redundant line card configuration is shown in FIG. 1. The arrangement comprises a first line card 3 which is normally active and a second line card 5 which is normally inactive and provides protection for the active card. Each card has a control processor (CPU) 7, 9 for controlling operations of the line card, a receiver 11, 13 for receiving control signals from a management interface 15 via a communication bus 17 and for passing control signals to the control processor, and a messaging channel 19 connected between the cards for sending line status reports and release activity messages from one card to the other.

When a data communication aspect of the active card malfunctions, the fault is detected by the management interface, and the management interface automatically controls the transfer of operations from the active to the inactive card. In particular, the management interface transmits a message to the active card via the communication bus to release activity. Once the active card releases its activity latch, the redundant card can be activated and takeover the functions of the malfunctioning card. The need for the active card to release its activity before the protection card can become active prevents both cards from being active at the same time.

One problem that has been encountered with the present configuration is that under certain fault conditions, the active card becomes entirely unreachable from the management interface, and the active card does not respond to the activity release message. In this event, the activity latch of the active card cannot be released and the redundant card cannot be activated to resume the communication functions of the active card. In this case, customers may experience significant disruptions to the communication service while the line card is down and maintenance staff are sent out into the field to rectify the fault.

SUMMARY OF THE INVENTION

According to the present invention, there is provided a device comprising a control processor for controlling operation of said device, a reset module adapted to be controlled independently of said control processor for performing a reset operation of said device, and a monitor for monitoring the control status of the device.

Advantageously, in this arrangement, the device includes a reset module which can be operated independently of the control processor so that the device can still be reset in the event of a software or hardware fault affecting the control processor. When implemented in a line card, this arrangement allows the activity latch to be released without the need to communicate a release message through the control processor so that the redundant card can be activated and protection invoked more reliably.

The device further comprises a monitor for monitoring the control status of the device. In some embodiments, the reset module is responsive to a predetermined control condition of the device to perform a reset operation. In some embodiments, the monitor is adapted to generate signal(s) indicative of the monitored control status. Advantageously, the monitored status can be used to control the reset module to reset the device.

Some embodiments include a monitor interface adapted to transmit information indicative of the monitored status from the device. Advantageously, the monitor monitors the control aspect of the device and the interface enables the control status of the device to be communicated to another device, such as a redundant device which takes over control functions of the first device if the first device malfunctions. The other device may be responsive to the monitored status to send a reset signal to the reset module of the first device.

Thus, the status monitor and interface enable the device to be monitored (and possibly reset) by a protection device. If the device is a line card (or other communication device), then one card can reset the other, without intervention from the management interface. The interface may be connected to transmit its status information to another device which monitors this status information. The other device may comprise a redundant device which is adapted to protect the first device. The monitor and interface may be adapted to generate and transmit status information automatically and/or periodically. In some embodiments, the monitor may be adapted to monitor the status of the control processor and/or control function (s) or operation(s) thereof or any other components of the device.

In some embodiments, the status monitor of the device may be used to control the reset module to reset the device independently of any external device, if the device detects a control malfunction, in which case, the device has the ability to reset itself. The reset status of the device may be used to activate another device, for example a protection or redundant device, which can take over operations of the first device. Thus, in some embodiments, the reset module is responsive directly to the status monitor to perform a reset operation on detection of a predetermined control condition, such as a malfunction.

In some embodiments, the monitor may be provided by the control processor. For example, the monitor may comprise a module of the control processor. In other embodiments, the monitor may be independent from the control processor, for example, an independent module.

In any embodiment, the monitor may be adapted to generate one or more signals indicative of the control condition of the device. If the monitor is part of the control processor, and the control processor malfunctions, the absence of a control status signal from the monitor could be used to cause the reset module to perform a reset operation.

In some embodiments, the device comprises a further interface for transmitting the monitored status information. Advantageously, the further interface provides redundancy for the first interface so that the device can still transmit status information if the first interface fails. The device may comprise a second monitor for monitoring the status of the first interface, and the further interface is responsive to the second monitor for transmitting the status information therefrom. In some embodiments, the further interface may comprise a messaging channel between line cards which is also used to transmit other messages such as line status reports and/or release activity messages.

In some embodiments, the device further comprises a status monitor for monitoring the status of another device. For example, the status monitor may be used to monitor the status (e.g. control status) of a redundant device which protects the first device.

In some embodiments, the device comprises a device status indicator, for example an activity latch, for indicating whether or not the device is in an active state, and the reset module is responsive to the reset signal to control the status indicator. The status indicator may be used to control operation of another device, for example, to enable operation of a redundant communication device, as indicated above.

In some embodiments, the device may further include a reset interface responsive to the status monitor for transmitting a reset signal to reset the other device. In this arrangement, the device can generate its own reset signal to reset, for example, a device which it protects, removing the need for both operator intervention and a release activity message from the management interface in the reset process, so that hand over of operations from one device to another is automatic, faster and more reliable.

In some embodiments, the device is connected to a management interface, the management interface having a monitor for monitoring a condition of the device, and a notification interface, operatively coupled to the monitor for sending a notification to another device based on the monitored condition. The management interface may monitor whether or not the device is still reachable by the management interface and if the device becomes unreachable, a notification of this condition is sent to another device via the notification interface. In some embodiments, the other device may include a control processor for controlling functions of the other device, and is responsive to the monitored condition to perform predetermined functions of the first device. For example, the other device may comprise a redundant device to protect the first device and is responsive to the notification from the management interface that the first device has become unreachable to take over the functions performed by the first device.

In some embodiments, the device is connected to a second device which is configurable to perform same predetermined functions of the first device, the second device comprising a monitor for monitoring status of the first device, and a reset interface responsive to the monitored status for sending a reset signal to the reset module of the first device. Advantageously, in this arrangement, the second device, which may provide redundancy for the first device, monitors the status of the first device and sends a reset signal to reset the first device, for example, so that the first device releases activity and allows the second device to take over its functions. This arrangement enables the protection device to detect a fault, such as an unreachable condition of the first device and automatically reset the first device so that it can take over activity. This obviates the need for both operator intervention and external reset messaging from the management interface to perform a reset operation.

Also according to the present invention, there is provided a device comprising a monitor for monitoring control status of another device, and an interface adapted to transmit a signal for resetting said other device in response to said monitor detecting a predetermined control status of said other device.

In this arrangement, the device is capable of automatically transmitting a reset signal to another device in response to detecting, for example, a malfunction or failure of the other device, so that resetting of the other device can be performed without operator intervention.

In some embodiments, the device includes a control processor for controlling operation of the device. The control processor may be adapted to perform operations of the other device in response to resetting of the other device. In this arrangement, the device which monitors and transmits the reset signal provides protection for the other device.

Also according to the present invention, there is provided an apparatus comprising a monitor for monitoring a condition of first and second devices, each device being capable of performing functions of the other device, and an interface for transmitting a predetermined signal to at least one of the first and second devices in response to the monitor detecting a predetermined condition.

In some embodiments, the condition is a malfunction of a control function of one of the devices.

In some embodiments, the apparatus may be implemented as a management interface for managing operations of both an active and redundant line card. This arrangement enables the management interface to monitor a condition of both line cards, for example, a condition related to control functions such as whether a line card becomes unreachable, and to notify the other line card of the detected condition so that it can take the required action, such as resetting the unreachable card and taking over its operations. In this way, the management interface can manage automatically (i.e. without operator intervention) the transfer of control functions from one device to another.

BRIEF DESCRIPTION OF THE DRAWINGS

Examples of embodiments of the present invention will now be described with reference to the drawings, in which.

DESCRIPTION OF EMBODIMENTS

Figure 1:
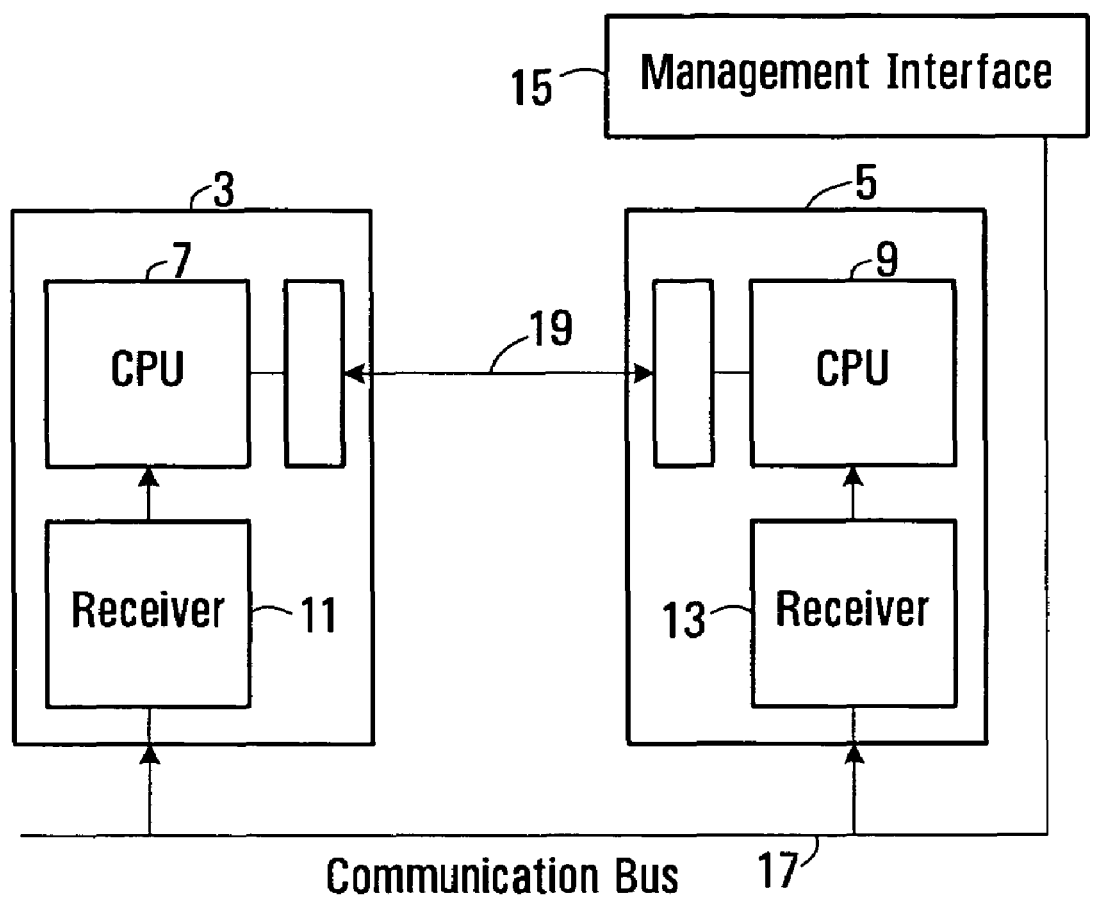
FIG. 1 shows an example of a redundant line card configuration according to the prior art.
Figure 2:
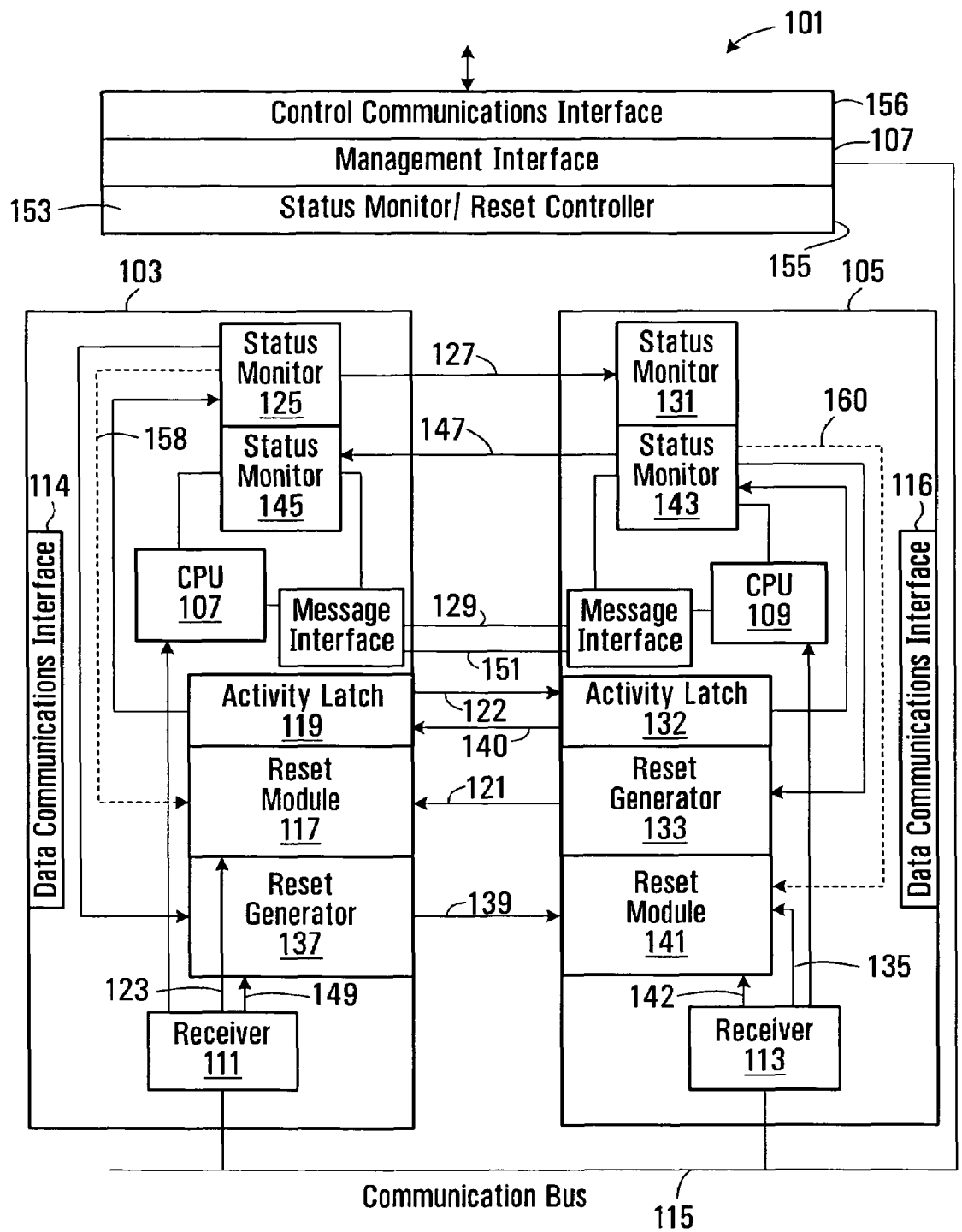
FIG. 2 shows a block diagram of a device and protection device arrangement according to an embodiment of the present invention.

Referring to FIG. 2, a protected circuit arrangement 101, according to an embodiment of the present invention comprises a first line card 103, which is normally active, a second line card 105, which is normally inactive and is provided to protect the active line card 103 in the event of a malfunction, and a management interface 107. The first and second line cards each comprise a control processor 107, 109 (or controller) for controlling operations of the respective card. Each card also comprises a receiver 111, 113 for receiving data from a communication bus 115 and passing relevant control data to its respective control processor 107, 109. Each card also includes a data communication interface 114, 116 for connection to a data communication network (not shown).

The first line card 103 further comprises a reset module 117 which is adapted to be controlled independently of the control processor 107 for performing a reset operation of the card. The reset operation may include the release of an activity latch 119 which, when released, enables the second card 105 to takeover operations of the first card. In this embodiment, the reset module 117 includes a reset control interface 121 for receiving a reset signal from the second card. The reset interface includes a communication link, which may be implemented in any suitable manner, for example a wire or bus connection. The link may be dedicated to transmitting only reset signals, or signals related to resetting the device. The first card may further include an interface 122 for communicating the status of the activity latch 119 to the second card 105. Some embodiments may further include a second reset control interface 123 for receiving a reset signal from another device, such as the management interface 107, via the communication bus 115 and the receiver 111.

In another embodiment, the second card may be adapted to become active in response to its transmitting a reset signal to the first card, thereby eliminating the need for the second card to detect the activity latch status of the first card. However, in a preferred implementation, the second card is adapted to detect a transition in the activity latch before it can assume activity, to help ensure that both cards are not active at the same time. This feature can be implemented by configuring the activity latch 132 of the second card always to adopt the opposite state of the activity latch 119 of the first card. In the embodiment of FIG. 2, the status of the activity latch of the first card is communicated to the activity latch of the second card, and a change in the activity latch status of the first card causes the second card's activity latch to change to the opposite state (i.e. either active or inactive). Each card is aware of the status of its own activity latch, and the status controls whether the card is active or inactive.

In some embodiments, the reset module comprises a device which includes its own dedicated hardware and is separate from the control processor. The functionality of the reset module may also be implemented in hardware, or in software, or a combination of both. In some embodiments, the reset module may be programmable.

The first card 103 includes a monitor 125 for monitoring the status of the first card and a monitor interface 127 for transmitting status information to the second card 105. The monitor interface may comprise any suitable communication link such as a wire line or data bus, and in one embodiment comprises a "mate link" which is conventionally provided between a working and protection card, but which has hitherto not been used. The monitor 125 may be adapted to monitor the status of one or more components of the card, including any one or more of the control processor, the activity latch and device(s) or module(s) enabling control communications, and to generate status information indicative of the monitored status. The status information may be generated in multiple bit codes (e.g. 8-bit codes). Different codes may identify the different components of the card being monitored and/or a particular status of the card or one or more of its components. In some embodiments, the monitor 125 is adapted to transmit status information periodically.

In some embodiments, the monitor may be implemented by the control processor. For example, the monitor may comprise a part or module of the processor. In this case, signal(s) indicative of the control status are generated by a portion of the control processor, or under its control. If the control processor malfunctions, so that the monitor is unable to generate status information, the absence of a status signal may be used to control the reset module.

In other embodiments, the monitor may be independent of the control processor, and may be adapted to generate control status signals if the control processor malfunctions.

The first card 103 further comprises a message interface 129 for transmitting messages from the first card to the second card. The message interface 129 may also be adapted to transmit information relating to the status of the first card to the second card. For example, the message interface may be adapted to transmit status information that cannot be transmitted by the monitor interface 127. Alternatively, or in addition, the message interface 129 may be used to transmit the status information normally transmitted by the monitor interface 127 if the monitor interface fails, and therefore can provide redundancy for the monitor interface. In one implementation, the monitor 125 may also be adapted to monitor the status of the monitor interface 127 and if a malfunction is detected, the monitor passes the status information to the messaging interface 129.

The second line card 105 includes a monitor 131 connected to the monitor interface 127 for receiving status information transmitted by the status monitor 125 of the first card. The second card also includes a reset generator 133 for generating a reset signal and transmitting the reset signal to the reset module 117 of the first card via the reset interface 121. (In other embodiments, the reset signal may be generated by another device, and transmitted through the reset interface to the reset module of the first card.) The status monitor 131 is operatively coupled to the reset generator 133 to enable the monitor to control operation of the reset generator. If the status monitor detects a malfunction of the first card, as indicated by status information transmitted over the monitor interface 127, the monitor 131 sends a control signal to the reset generator 133 to transmit a reset signal to the reset module 117 of the first card.

In this embodiment, the status monitor 131 is also connected to the message interface 129 for receiving status information therefrom relating to the first card if the message interface is used for this purpose. Again, if the status information received via the message interface 129 indicates a malfunction of the first card, the monitor sends a control signal to the reset generator to transmit a reset signal to reset the first card.

The reset generator may also include an interface 135 for receiving control signals from the receiver 113. Advantageously, this enables the reset generator also to be controlled by the management interface via the communication bus 115.

Any one or more of the functions described above which are implemented by the first card may also be implemented in the second card. Alternatively, or in addition, any one or more of the functions described above in connection with the second card may also be implemented in the first card. In this way, the first card may be adapted to monitor the status of the second card and to generate a reset signal for resetting the second card. Likewise, the second card may include a reset module which can be controlled independently of its control processor to reset the second card in response to a reset signal from the first card. These functions are also implemented in the embodiment shown in FIG. 2. However, in other embodiments, any one or more of these functions may be omitted.

Referring again to FIG. 2, the first card 103 includes a reset generator 137 and a reset interface 139, and the second card includes a reset module 141 connected to receive reset signals from the reset interface 139. As for the first reset interface 121, the second reset interface 139 may be a dedicated reset channel, i.e. is exclusively for the purpose of passing reset signals (or signals related to resetting the second card) from the reset generator of the first card to the reset module of the second card. The reset module 141 may operate to control an activity latch 132 in response to a reset signal to enable the first card to takeover functions of the second card when the activity latch is released. In one embodiment, the reset module 141 of the second card provides an indication of the activity latch status to the first card to enable the first card to become active. The status of the activity latch may be communicated to the second card over an interface 140.

In another embodiment, the first card may be adapted to become active in response to its transmitting a reset signal to the second card, thereby eliminating the need for the first card to detect the activity latch status of the second card. However, as described above in connection with the second card, in a preferred implementation, the first card is adapted to detect a transition in the activity latch of the second card before it can assume activity, to help ensure that both cards are not active at the same time.

The second card 105 includes a status monitor 143 which monitors the status of one or more components of the second card, which may include the status of the control processor 109. The first card includes a status monitor 145 which is connected to the status monitor 143 of the second card by a monitor interface 147. The status monitor 145 is operatively coupled to the reset generator 137. The status monitor 143 of the second card generates status signals indicative of the status of the second card and transmits the signals to the status monitor 145 of the first card via the status interface 147. If the status monitor 145 detects a malfunction or fault that warrants transferring activity to the first card, the monitor 145 transmits a control signal to the reset generator 137 to generate a reset signal for releasing activity of the second card. As the second card has a reset module which is controlled independently of the control processor, the second card can be reset even if it becomes unreachable.

In the embodiment of FIG. 2, the reset signal generator 137 of the first card may also be controllable by one or more external devices such as a management interface. For example, a reset control interface 149 may be provided between the receiver 111 and the reset generator 137 for passing a reset control signal from the management interface 107 to the reset generator via the communication bus 115.

The second card 105 may also include a message interface 151 operatively coupled to the status monitor 143 for transmitting additional status messages from the second card to the first card which cannot otherwise be transmitted via the status interface 147. The message interface 151 may also be used to provide redundancy for the status interface 147 to carry status information, in the event that the status interface 147 malfunctions or fails.

In another embodiment, the status monitor of the first card and/or the second card (or device) may be adapted to control the reset module of that card, without the need to involve the other card (or any other external device, such as a management interface). The monitor may communicate control status information to the reset module, as schematically indicated by the broken line path 158, 160. In this embodiment, the reset module may be adapted to detect a malfunction affecting control of the device, and perform a reset operation. The reset module may change the state of the activity latch to 'inactive'. This change in state may cause the activity latch of the other card to change to the active state, and in this way, the other card can become active and take over functions of the malfunctioning card. In embodiments which have this 'self reset' capability, the monitor need not be implemented to send control status information externally of the device, and the monitor interface could be omitted, or not used for this purpose. In other embodiments, the status monitor could be adapted to transmit control status information externally of the device, and to control the device's own reset module.

Another aspect of the present invention provides a management interface for monitoring the status of both the active and inactive (protection) cards. An embodiment of such a management interface is also shown in FIG. 2. The management interface 107 includes a status monitor 153 and a reset control module 155. A control communication network interface 156 may be provided for connecting the management interface to a network (not shown).

The status monitor 153 is adapted to monitor the status of the first and second cards 103, 105 by detecting responses from the cards. In a basic embodiment, the status monitor is adapted to detect if either card becomes unreachable. Such a condition may be indicated by a card providing a nil or erroneous response to a message from the management interface. If one of the cards becomes unreachable, the status monitor 153 determines which of the two cards has become unreachable and, in response, the reset controller 155 is adapted to transmit a reset control signal to the reachable card to cause the reachable card to reset the unreachable card. In this way, the management interface can be implemented to indirectly access the automatic reset feature by communicating information to a reachable card to reset an unreachable card. In one embodiment, the reset control signal from the management interface is transmitted to the reset generator of the reachable card which subsequently generates and transmits a reset signal to the reset module of the unreachable card to release activity. In addition, or alternatively, the reset controller 155 may be adapted to transmit a reset control signal directly to the reset module of the unreachable card to release activity. When the reachable card detects that the activity latch of the other card has been released, it becomes active and takes over functions of the unreachable card.

Signals transferred between the status monitor and each card may be transmitted on the communication bus 115 between the cards and the management interface, or via another interface, such as another bus. Similarly, reset control signals from the reset controller 115 to each card may be transmitted on the communication bus 115, or on another interface, for example another bus.

In other embodiments, the status monitor 153 may be adapted to monitor other forms of status information from each card, other than whether a card has become unreachable, and the reset controller may be adapted to transmit reset control signals to reset a card depending on its monitored condition. Thus, even if a card has not become unreachable, but malfunctions are detected, the reset controller can control the reset generator of the operable card or the reset module of the malfunctioning card to enable the operable card to take over activity.

In some embodiments, the management interface is adapted to provide an indication such as an alarm, on detecting that a card has become unreachable. The indication may also identify which card has become unreachable.

Figure 3:
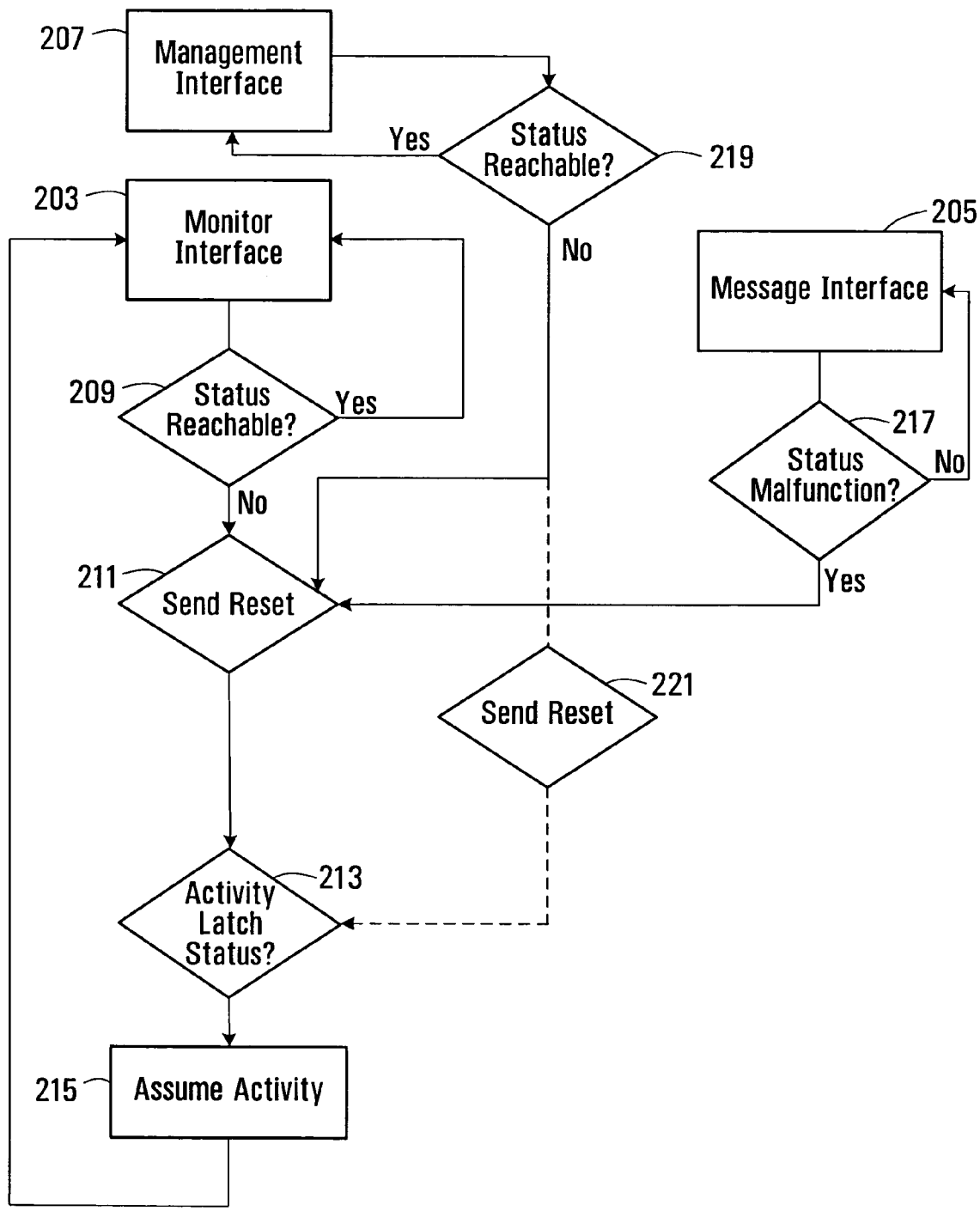
FIG. 3 shows a flow chart illustrating an example of operations of the embodiment shown in FIG. 2.

FIG. 3 shows an example of a flow diagram illustrating operation of the redundant system shown in FIG. 2. Step 203 indicates monitoring of one card by the other card through signals transmitted on the monitor interface 127, 147. Step 205 indicates additional monitoring of the hardware and/or software status of the monitored card.

Step 207 indicates monitoring of the card by the management interface. At step 209, the status of the monitored card is assessed by the monitoring card and if the status is satisfactory, the monitoring card waits until the next assessment is to be made. On the other hand, if the status shows that the card is unreachable (or malfunctions), the monitoring card sends a reset signal to the monitored card at step 211. On receipt of the reset signal, the reset module of the monitored card sets the activity latch to release activity at step 213. At step 215, the monitoring card detects that activity of the monitored card is released, and the monitoring card becomes active and takes over functions from the monitored card.

Similarly, the monitoring card, at step 217 assesses the status of the monitored card on the basis of signals transmitted via the messaging channel 129, 151, and if the status is satisfactory, the monitoring card waits until the next assessment is to be made. On the other hand, if the assessment shows that the monitored card is unreachable or malfunctioning, the process proceeds to step 211 where the monitoring card transmits a reset signal to the monitored card to reset the activity latch.

In a similar manner, the status monitor of the management interface makes an assessment of the status of the monitored card at step 219. If the monitored status is satisfactory, the management interface waits until the next assessment is to be made. On the other hand, if an unreachable condition is detected, the process proceeds to step 211 to cause the reset generator of the monitoring card to generate and transmit a reset signal to the monitored card. Alternatively, the management interface may be adapted to transmit its own reset signal directly to the monitored card (e.g. via the communication bus and receiver), in which case step 219 proceeds to step 221.

Embodiments of the invention may be implemented in any 1+1 line card configuration. Embodiments of the invention can also be implemented in any device or circuit to provide protection therefor, including any communication device or other device.

In other embodiments of the present invention, any one or more features described above in connection with the embodiment of FIGS. 2 and 3 or any other embodiment disclosed herein may be omitted and/or replaced by another feature. Other aspects and embodiments of the invention comprise one or more features disclosed herein in combination with any one or more other features disclosed herein.

Modifications and changes to the embodiments described above will be apparent to those skilled in the art.

The invention claimed is:

1. A device comprising a control processor for controlling operation of said device,
a reset module adapted to be controlled independently of said control processor for performing a reset operation of said device, and
a monitor for monitoring the control status associated with control of the device by the control processor.

2. A device as claimed in claim 1, further comprising at least one of: (1) a reset control interface for receiving a reset signal, said reset module being responsive to said reset signal to perform said reset operation, and (2) a monitor interface adapted to transmit information indicative of the monitored control status from the device.

3. A device as claimed in claim 2 wherein said device comprises a device status indicator for indicating whether or not the device is in an active state, and said reset module is responsive to said reset signal to control said status indicator.

4. A device as claimed in claim 1, wherein said monitor is adapted to monitor status of at least one of said control processor, a control function of said device, a device status indicator, and means enabling control communications.

5. A device as claimed in claim 2, comprising a further interface for transmitting said information indicative of the monitored control status.

6. A device as claimed in claim 5, further comprising a second monitor for monitoring the status of said monitor and/or said monitor interface, and wherein said further interface is responsive to said second monitor for transmitting said information indicative of the monitored status.

7. A device as claimed in claim 1, further comprising a status monitor for monitoring the status of another device.

8. A device as claimed in claim 7, further comprising a reset interface responsive to said status monitor for transmitting a reset signal for resetting said other device.

9. A device as claimed in claim 1, connected to a management interface, the management interface having a monitor for monitoring a condition of said device, and a notification interface operatively coupled to the monitor for sending a notification to another device based on said monitored condition.

10. A device as claimed in claim 9, wherein said condition is at least one of (1) a condition that relates to the control status of the device, and (2) whether or not said device responds in a predetermined manner to an external communication.

11. A device as claimed in claim 9, connected to another device, said other device having a control processor for controlling functions of said other device, said other device being responsive to said monitored condition to perform predetermined functions of said first device.

12. A device as claimed in claim 1, connected to a second device configurable to perform some predetermined functions of said first device, said second device comprising a monitor for monitoring control status of said first device, and a reset interface responsive to said monitored status for sending a reset signal to said reset module.

13. A device as claimed in claim 12, wherein said second device further comprises a first interface for receiving signals indicative of the monitored control status of said first device and a second interface for receiving signals indicative of said monitored status.

14. A device as claimed in claim 1, further comprising a communication interface for receiving data, determining from the data, data intended for said control processor, and for passing data intended for said control processor thereto.

15. A device as claimed in claim 1, further comprising a network interface for connecting said device to a data communication network.

16. A device comprising
a monitor for monitoring control status of another device, and
an interface adapted to transmit a signal for resetting said other device in response to said monitor detecting a predetermined control status of said other device.

17. A device as claimed in claim 16, wherein said device comprises a control processor adapted to perform operations of said other device in response to resetting of said other device.

18. A device as claimed in claim 16, wherein said predetermined status is that said other device is not capable of responding in a predetermined manner to an external signal.

19. A device as claimed in claim 16, wherein said device comprises a communication device having a network interface for connection to a communication network.

20. A device as claimed in claim 16, wherein said device comprises a management interface for managing operations of said other device, and wherein said interface is adapted to transmit said signal to at least one of said other device, and a device capable of performing functions of said other device and which includes an interface for transmitting a reset signal to said other device.

21. An apparatus comprising
a monitor for monitoring a condition of first and second devices, the first and second devices being capable of performing functions of each other, and
an interface for transmitting a predetermined signal to at least one of said first and second devices in response to said monitor detecting a predetermined condition.

22. An apparatus as claimed in claim 21, wherein said monitor is adapted for determining from which of said first and second devices said predetermined condition originated, and a selector for selecting which of said first and second devices to send said signal based on said determination.

23. An apparatus as claimed in claim 21, wherein said condition is whether one of said first and second devices is capable of performing predetermined communication, and said signal is indicative of whether a device is capable of performing said predetermined communication.

24. An apparatus as claimed in claim 21, further comprising alarm generating means to generate an alarm in response to said monitor detecting said predetermined condition, wherein said alarm indicates the device from which the predetermined condition originates.

* * * * *